G. C. DE BAY.
DEVICE FOR HOT POLISHING GLASS.
APPLICATION FILED MAY 26, 1909.

1,000,378.

Patented Aug. 15, 1911.

WITNESSES

INVENTOR
George C. DeBay.
By Fred'k W. Winter
Attorney.

UNITED STATES PATENT OFFICE.

GEORGE C. DE BAY, OF TARENTUM, PENNSYLVANIA, ASSIGNOR OF ONE-HALF TO JOSEPH HEIDENKAMP, OF SPRINGDALE, PENNSYLVANIA.

DEVICE FOR HOT-POLISHING GLASS.

1,000,378.     Specification of Letters Patent.     Patented Aug. 15, 1911.

Application filed May 26, 1909. Serial No. 498,555.

*To all whom it may concern:*

Be it known that I, GEORGE C. DE BAY, a resident of Tarentum, in the county of Allegheny and State of Pennsylvania, have invented a new and useful Improvement in Devices for Hot-Polishing Glass, of which the following is a specification.

This invention relates to a device for smoothing hot finished glass, such as glass which has been fire polished, in order to eliminate or smooth out the waves, undulations or other irregularities in the glass, but without affecting the polish given by the fire finish.

Figure 1:
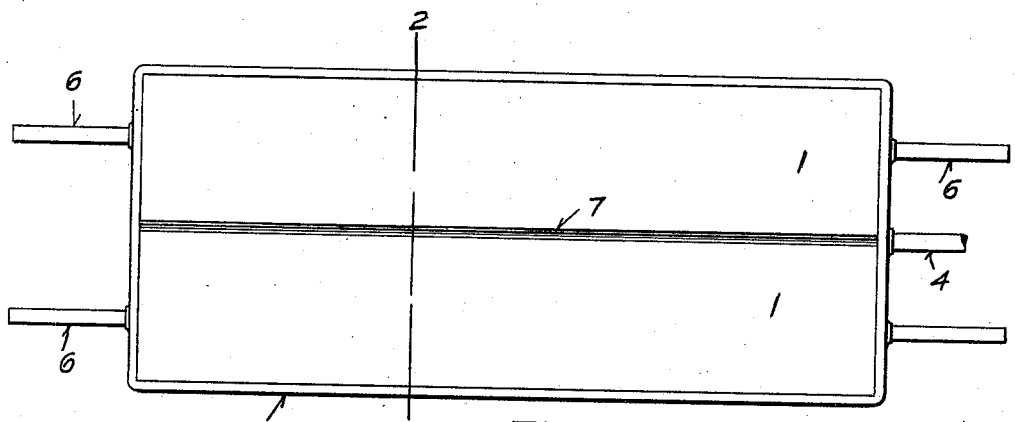
Figure 2:
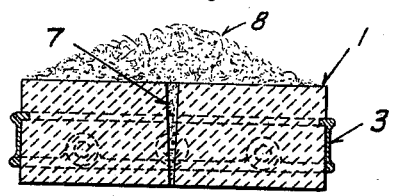

In the accompanying drawing Figure 1 is a plan view of a block constructed according to my invention; and Fig. 2 is a transverse section thereof on the line 2—2, Fig. 1.

In an application of even date herewith, Serial No. 498,553 I have described and claimed a process for the manufacture of polished plate or sheet glass by a hot process purely, with no grinding or polishing in the ordinary sense, but securing the polish by a fire finish. The fire polishing is likely to produce slight waves or undulations on the surface of the glass, which if not eliminated give the glass more the appearance of ordinary window glass instead of that of polished plate glass. To remove all irregularities, the surface while still hot and plastic is subjected to a very light rubbing action of a suitable device which smooths out the waves or irregularities and leaves a perfectly flat glazed surface and forms glass having all of the characteristics of a polished plate. This polishing device must be of such a nature that it is absolutely non-abradent and non-adhesive to the hot glass, and also such as will become heated and hold the heat so as not to chill the glass surface while acting thereon. A polishing block well adapted for this purpose is the subject of this application.

The device is shown in the form of a block or blocks 1 which in the present instance are formed of a very fine non-abradent carbon and a suitable binding or cementitious material therefor. The carbon employed is preferably such as produced by charring oak wood which comes off in flakes forming a very smooth charcoal or charflake. Other forms of carbon, such as lamp black and the like, having absolutely no abradent qualities are also suitable for the purpose. Graphite may also be used. As a binder for holding together the smooth fine carbon and forming it into a substantial body I prefer plaster of Paris or other cementitious material having no abradent qualities. The charflake and plaster of Paris are mixed in substantially equal proportions in volume, and are then wet and molded to form a block of the desired size and shape. The rubbing surface of this block is then smoothed off in any suitable way. This block is preferably held in or surrounded by a metal band or frame 3 connected to the reciprocating means, such as a strap 4 for surrounding an eccentric as shown in my application aforesaid, and also provided with suitable guiding means 6 on the opposite ends. Preferably the polishing device is formed in two or more blocks with a slight space or spaces therebetween, or with an opening or openings through a single block, as shown at 7, Fig. 2, in order that loose charflake 8 may be placed on top of the block and can gradually sift down through the opening or slot and spread out over the under surface of the block.

The particular composition described is capable of being heated to such an extent that it prevents chilling the glass and at the same time is absolutely non-abradent so that it produces no scratching effect, but merely acts to smooth out the waves in the fire polished surface of the glass while still plastic, and is also absolutely smooth and non-porous so that it will not adhere to the hot glass and tear the plastic surface.

While the particular ingredients above named are preferred and have been found very satisfactory for this purpose, I wish it understood that the invention is not limited thereto, but comprises any ingredients having substantially the same characteristics as those named for the purpose intended. The charflake and the plaster of Paris can be brought to an absolutely smooth non-porous surface and in use they wear down uniformly.

What I claim is:

1. A device for rubbing over plastic plate glass to smooth the same, comprising a body having a flat rubbing face and composed of fine smooth carbon and cementitious material binding the carbon together, said ingredients being combined in such proportions as to form a firm body but one which will wear away in the rubbing action, said body being provided with projections for guiding the same.

2. A device for rubbing over plastic plate glass to smooth the same, comprising a body having a flat rubbing surface and composed of fine smooth vegetable charcoal and a cementitious binding material, said ingredients being combined in such proportions as to form a firm body but one which will wear away under the rubbing action, said body being provided with projections for guiding the same.

3. A device for rubbing over plastic plate glass to smooth the same, comprising a body having a flat rubbing face and composed of fine smooth carbon and plaster of Paris mixed together and molded in such proportions as to form a firm body but one which will rub away under the rubbing action, said body being provided with projections for guiding the same.

4. A device for rubbing over plastic plate glass to smooth the same, comprising a body having a flat rubbing face and composed of fine smooth vegetable charcoal and plaster of Paris mixed together and molded in such proportions as to form a firm body but one which will wear away under the rubbing action.

5. A device for rubbing over plastic plate glass to smooth the same, comprising a body having a flat rubbing face and composed of fine smooth carbon and cementitious material binding the carbon together, said ingredients being combined in such proportions as to form a firm body but one which wears away in the rubbing action, said body being provided with an opening or openings therethrough for permitting loose carbon to pass through.

In testimony whereof, I have hereunto set my hand.

GEORGE C. DE BAY.

Witnesses:
F. W. WINTER,
JOHN S. CORT.

Copies of this patent may be obtained for five cents each, by addressing the "Commissioner of Patents, Washington, D. C."